(12) United States Patent
Li et al.

(10) Patent No.: US 12,522,857 B2
(45) Date of Patent: Jan. 13, 2026

(54) COMPOSITIONS AND METHODS OF TARGETED NUCLEIC ACID ENRICHMENT BY LOOP ADAPTER PROTECTION AND EXONUCLEASE DIGESTION

(71) Applicant: King Abdullah University of Science and Technology, Thuwal (SA)

(72) Inventors: Mo Li, Thuwal (SA); Chongwei Bi, Thuwal (SA); Lin Wang, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 1137 days.

(21) Appl. No.: 17/436,398

(22) PCT Filed: Mar. 4, 2020

(86) PCT No.: PCT/IB2020/051846
§ 371 (c)(1),
(2) Date: Sep. 3, 2021

(87) PCT Pub. No.: WO2020/178759
PCT Pub. Date: Sep. 10, 2020

(65) Prior Publication Data
US 2022/0127661 A1    Apr. 28, 2022

Related U.S. Application Data

(60) Provisional application No. 62/898,892, filed on Sep. 11, 2019, provisional application No. 62/813,667, filed on Mar. 4, 2019.

(51) Int. Cl.
*C12Q 1/68* (2018.01)
*C12Q 1/6806* (2018.01)

(52) U.S. Cl.
CPC ....... *C12Q 1/6806* (2013.01); *C12Q 2521/30* (2013.01); *C12Q 2521/319* (2013.01);
(Continued)

(58) Field of Classification Search
None
See application file for complete search history.

(56) References Cited

U.S. PATENT DOCUMENTS

| | | | |
|---|---|---|---|
| 5,034,506 A | 7/1991 | Summerton | |
| 8,407,554 B2 * | 3/2013 | Kermani | H03M 13/1515 714/752 |

(Continued)

FOREIGN PATENT DOCUMENTS

| | | | | |
|---|---|---|---|---|
| WO | 2014018423 | 1/2014 | | |
| WO | WO 2015/053719 A1 * | 4/2015 | | B65D 65/10 |

(Continued)

OTHER PUBLICATIONS

Wang et al (Circular RNA oligonucleotides. Synthesis, nucleic acid binding properties, and a comparison with circular DNAs, Nucleic Acids Research 1994) (Year: 1994).*

(Continued)

*Primary Examiner* — Heather Calamita
*Assistant Examiner* — Elizabeth Rose Lafave
(74) *Attorney, Agent, or Firm* — PABST PATENT GROUP LLP

(57) ABSTRACT

Compositions and methods for enriching DNA from any loci of interest are provided. Endonuclease(s) such as RNA-guided nucleases Cpf1/Cas9 can cut the flanking regions of the gene of interest in, for example genomic DNA, followed by ligation of loop adapters. The loop adapters protect the gene of interest for subsequent digestion with one or more exonucleases. Multiple genes of interest can be digested and ligated with loop adapters at the same time. The undigested (Continued)

target sequence can be further purified by, for example, gel extraction using, for example, a commercial DNA purification kit. The enriched DNA can be used for sequencing.

18 Claims, 4 Drawing Sheets

Specification includes a Sequence Listing.

(52) U.S. Cl.
CPC . *C12Q 2525/205* (2013.01); *C12Q 2525/301* (2013.01); *C12Q 2535/122* (2013.01); *C12Q 2537/159* (2013.01)

(56) References Cited

U.S. PATENT DOCUMENTS

| | | | | |
|---|---|---|---|---|
| 9,410,198 | B2* | 8/2016 | May | A61P 19/02 |
| 10,036,012 | B2* | 7/2018 | Amorese | C12Q 1/6853 |
| 2014/0134610 | A1 | 5/2014 | Pham | |
| 2017/0073747 | A1 | 3/2017 | Joung | |
| 2017/0145492 | A1* | 5/2017 | Pham | C12P 19/34 |

FOREIGN PATENT DOCUMENTS

| | | | | |
|---|---|---|---|---|
| WO | WO 2017/218979 A1 * | 12/2017 | | C12Q 1/34 |
| WO | 2019030306 | 2/2019 | | |

OTHER PUBLICATIONS

Braasch, et al., "Locked nucleic acid (LNA): fine-tuning the recognition of DNA and RNA", Chem. Biol., 8(1):1-7 (2001).
Cong, "Multiplex genome engineering using CRISPR/Cas systems", Science, 15:339(6121):819-823 (2013).
Cretu, et al., "Mapping and phasing of structural variation in patient genomes using nanopore sequencing", Nat. Commun., 8:1326 (2017).
Jain, et al., "Nanopore sequencing and assembly of a human genome with ultra-long reads", Nat. Biotechnol., 36(4):338-345 (2018).
Jinek, et al., "A Programmable Dual-RNA-Guided DNA Endonuclease in Adaptive Bacterial Immunity", Science, 337(6096):816-21 (2012).
Loman, et al., "A complete bacterial genome assembled de novo using only nanopore sequencing data", Nat. Methods., 12:733-U751 (2015).
Simpson, et al., "Detecting DNA cytosine methylation using nanopore sequencing", Nat. Methods, 14(4):407-410 (2017).
Stirchak, et al., "Uncharged stereoregular nucleic acid analogs. 1. Synthesis of a cytosine-containing oligomer with carbamate internucleoside linkages", J. Organic Chem., 52(19):4202-4206 (1987).
Liu, et al., "Formation of a DNA Mini-Dumbbell with a Quasi-Type II Loop", Journal of Physical Chemistry Part B, 121(12):2554-2560 (2017).
International Search Report for corresponding PCT application PCT/IB2020/051846 dated May 14, 2020.

* cited by examiner

COMPOSITIONS AND METHODS OF TARGETED NUCLEIC ACID ENRICHMENT BY LOOP ADAPTER PROTECTION AND EXONUCLEASE DIGESTION

CROSS-REFERENCE TO RELATED APPLICATION

This application is a National Phase application under 35 U.S.C. § 371 of International Application No. PCT/IB2020/051846, filed on Mar. 4, 2020, which claims the benefit of and priority to U.S. Application No. 62/813,667 filed Mar. 4, 2019 and U.S. Application No. 62/898,892 filed Sep. 11, 2019, the contents of which are incorporated by reference in their entirety.

REFERENCE TO THE SEQUENCE LISTING

The Sequence Listing submitted as a text file named "KAUST_2019_113_03_PCT_ST25.txt," created on Mar. 3, 2020, and having a size of 1,113 bytes is hereby incorporated by reference pursuant to 37 C.F.R. § 1.52(e)(5).

FIELD OF THE INVENTION

The field of the invention generally relates to compositions and methods for enriching target nucleic acid sequence and optionally sequencing them.

BACKGROUND OF THE INVENTION

Precision medicine is the most promising frontier of modern medicine that leverages biomedical big data and advanced analytics, such as artificial intelligence, to deliver accurate and effective healthcare to society on a personalized basis. Genomic information is a cornerstone of personalized medicine, and many diseases have been found to be directly linked to genetic variants. Genetic tests, such as premarital and prenatal testing of inherited diseases, has been increasingly applied in the clinic. Besides diagnosis, patients' genomic information can be an important factor in the consideration of treatment options.

Genomic information can be obtained by sequencing. The human genome has 3.2 billion base pairs, in which the estimated 20,000 protein-coding genes account for 1.2-1.5 percent. It cost 2.7 billion dollars to sequence the first human genome in the last century using a Sanger sequencing method. Sanger sequencing is expensive, and low throughput. Its short read length (~700 base pairs) hinders detection of mutations in large loci. With the help of Next-generation sequencing (NGS), the price of sequencing has dropped considerably but whole genome sequencing still remains costly and inefficient, which limits its application in regular and/or routine diagnosis.

Most genetic diseases only involve one or a few genes. Sequencing the whole genome to search for variants in a few genes is highly inefficient in terms of sequencing resource and data interpretation. For example, whole genome or exosome data are often excessive for testing of specific diseases or populations, yet they require large investment in capital equipment and computational power and necessitate trained bioinformaticians and geneticists for data analysis. Targeted DNA enrichment followed by NGS is a state-of-the-art strategy to reduce sequencing cost. In this strategy, only the genes of interest will be enriched for sequencing and most of the sequencing capacity will be used in the desired region.

Currently, targeted DNA enrichment is mainly done by PCR or probe capture. The PCR method uses a pair of primers to amplify a small region of DNA. The biases and errors introduced by PCR could negatively influence the downstream sequencing. Additionally, PCR-based methods do not work in regions containing repetitive sequences. The probe capture method is often used to prepare sequencing libraries. The biotinylated probe method has a low capture efficiency and specificity and can only work with short DNA fragments.

Therefore, there is a need for new DNA enrichment technologies.

Thus, it is an object of the invention to provide compositions and methods for improved nucleic acid enrichment.

It is a further object of the invention to provide compositions and methods that enrich target nucleic acid molecules with high efficiency and/or specificity, and preferably little or no bias in enriched regions, preferably without compromise in nucleic acid length.

It is a further object of the invention to overcome the current limitations of nucleic acid enrichment and improve the application of the genomic diagnosis in personalized medicine.

SUMMARY OF THE INVENTION

Compositions and methods of enriching desired, target nucleic acids in a nucleic acid sample are provided.

The methods typically rely on a nucleic acid loop adapter that can protect the target nucleic acid from exonuclease digestion. The loop adapters typically include
 (i) a sticky end nucleic acid segment designed to hybridize with a sticky end of a target linear nucleic acid;
 (ii) a first hybridization nucleic acid segment designed to hybridize with a second hybridization nucleic acid segment;
 (ii) a loop nucleic acid segment that does not hybridize (i.e., remains single stranded); and
 (iv) the second hybridization nucleic acid segment.

The sticky end segment can include or consist of, for example, any integer number of nucleotides between 1 and 50 inclusive, or between about 1 and about 10, or between about 1 and about 5 nucleotides inclusive, or 4 nucleotides.

The first hybridization nucleic acid segment can include or consist of any integer number of nucleotides between 1 and 100 inclusive, or between about 3 and about 50, or between about 5 and about 25, or between about 5 and 15 nucleotides inclusive, or 9 nucleotides. In particular embodiments, the first hybridization nucleic acid segment includes or consists of the sequence CAGTCCAGG (SEQ ID NO:2).

The loop nucleic acid segment can include or consist of an integer number of nucleotides between 1 and 50 inclusive or between about 1 and about 10, or between about 1 and about 5 nucleotides inclusive, or 4 nucleotides. In a particular embodiment, the loop nucleic acid segment includes or consists of the sequence "CTTG."

The second hybridization nucleic acid segment can include or consist of any integer number of nucleotides between 1 and 100 inclusive, or between about 3 and about 50, or between about 5 and about 25, or between about 5 and 15 nucleotides inclusive, or 9 nucleotides. In a particular embodiment, the second hybridization nucleic acid segment includes or consists of the sequence CCTGGACTG (SEQ ID NO:3).

Loop adapters can have the orientation 5'-stick end segment-first hybridization segment-loop segment-second hybridization-3'. Loop adapters can also have the orientation 5'-first hybridization segment-loop segment-second hybridization-stick end segment-3'.

The sequence of the loop adapter can include a recognition site for a restriction enzyme that allows the adapter to be removed from the target linear nucleic acid, for example, prior to sequencing. In some embodiments, the target linear nucleic acid is free from the recognition site.

An exemplary loop adapter structure is illustrated in FIG. 2A. An exemplary loop adapter sequence is also illustrated in FIG. 2A (e.g., SEQ ID NO:1), wherein "NNNN" can be a nucleic acid sequence that hybridizes with a sticky end on a target double stranded linear nucleic acid.

The nucleic acid adapters can include, or consist of, DNA, RNA, or modified nucleobases, sugars, and/or linkages thereof, and combinations thereof. In some embodiments, the adapters consist of DNA.

Compositions including a plurality of nucleic acid loop adapters are also provided. The composition can include any integer between 1 and 1,000 inclusive of different nucleic acid loop adapter sequences.

Methods of enriching a target nucleic acid or acids using the disclosed adapters are also provided. A typically method includes
(i) ligating one or more nucleic acid loop adapters to linear target nucleic acids in a nucleic acid sample including the linear target nucleic acids, and
(ii) treating the nucleic acid sample with one or more exonucleases.

Typically, the sticky end nucleic acid segment of the loop adapter hybridizes with a sticky end(s) of a target linear nucleic acid.

Typically, the loop adapter ligated nucleic acids are undigested by the exonuclease(s) (i.e., protected from the exonuclease(s)) and non-adapter ligated nucleic acids are digested by the exonuclease(s) (i.e., unprotected from, or vulnerable to, the exonuclease(s)). Exemplary exonucleases include, but are not limited to, lambda exonuclease, exonuclease I, or a combination there, optionally in a ratio of 3:1.

The method can further include enriching or purifying the undigested nucleic acids.

In some embodiments, the nucleic acid sample is mechanically, chemically, or enzymatically sheared or digested prior to ligation of the adapter sequences. For example, in some embodiments, the nucleic acid samples is treated with one or more endonucleases prior to ligation of the adapter sequences.

The endonuclease(s) can be part of a CRISPR/Cas system including one or more guide RNAs that specifically targets each endonuclease to the linear target nucleic acid.

In particular embodiments, the one or more endonucleases include a pair of RNA-guided nucleases (e.g., cas9 or cpf1, etc.) that are specifically designed to cut the 5' and 3' flanking sequences of the target nucleic acid sequence.

In some embodiments, the one or more endonucleases create 5' and/or 3' sticky ends flanking the linear target nucleic acid.

In some embodiments, the 3' and/or 5' ends or sticky ends of the linear target nucleic acid are extended using a polymerase.

In some embodiments, the nucleic acid sample is treated with one or more alkaline phosphatases, such as Shrimp Alkaline Phosphatases, prior to ligation of the loop adapters.

The methods can further include sequencing the undigested nucleic acids. The sequencing can include forming a sequencing library from the undigested nucleic acids, by, for example, attaching sequencing adapter sequences. In some embodiments, the loop adapters are first removed. The sequencing can include a long-read sequencing technology, such as for example, a Nanopore sequencing technology.

In some embodiments, some or all of the nucleic acids are DNA.

BRIEF DESCRIPTION OF THE DRAWINGS

FIG. 2A is an illustration of the primary and secondary structures of a loop adapter (5'-NNNNCAGTCCAGGCTTGCCTGGACTG-3' (SEQ ID NO:1)). "NNNN" represents any nucleotide to be complementary with the sticky end of the gene of interest. FIGS. 2B-2D are plots showing the results from a fragment analyzer: lambda exonuclease and exonuclease I mix can digest most of the undesired DNA. FIG. 2E is a photograph of an electrophoretic gel. From left to right the lanes are labeled as DNA, DNA+Buffer, DNA+Buffer+exonuclease, ladder, +ligase+lambda exonuclease, +ligase+2 µl loop adapter+lambda exonuclease, +ligase+1 µl loop adapter+lambda exonuclease, +ligase+2 µl loop adapter+lambda exonuclease+exonuclease I, and show that the loop adapter can protect DNA from being digested by exonuclease.

DETAILED DESCRIPTION OF THE INVENTION

I. Definitions

Figure 1:
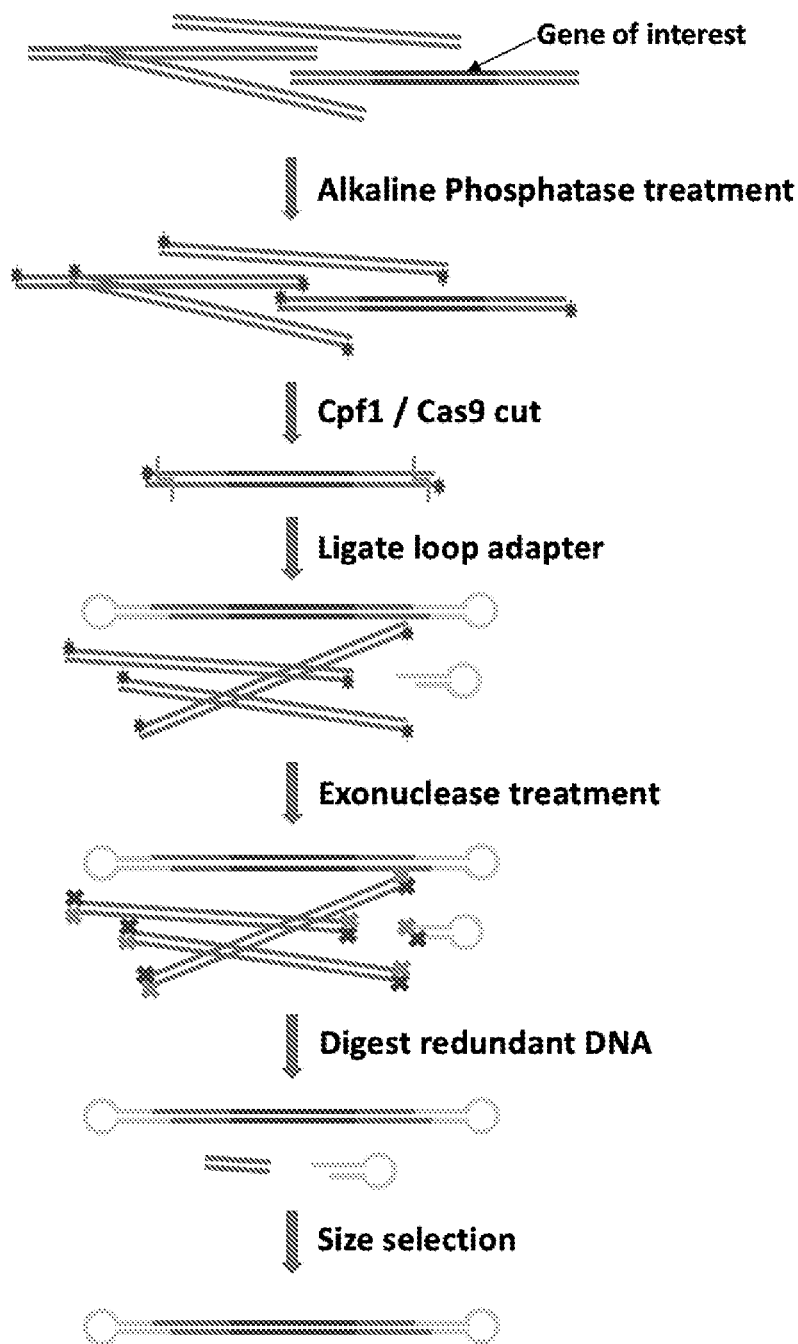
FIG. 1 is a schematic showing the structure and an exemplary work flow of using loop adapters and exonucleases to enrich DNA. The extracted DNA has two exposed ends due to the random shearing during extraction. The whole DNA can be treated with alkaline phosphatase to dephosphorylate the exposed end. Endonuclease such as Cpf1 or Cas9 can be used to specifically digest the flanking region of the gene of interest to generate the phosphorylated end. The phosphorylated end can be ligated with loop adapters, which will protect only the gene of interest from being digested by the exonuclease mixture. An additional, optional size selection can further enrich the targeted gene and purify the DNA.

As used herein, "isolated," "isolating," "purified," "purifying," "enriched," and "enriching," when used with respect to nucleic acids of interest (e.g., DNA such as intact or fragmented genomic DNA, amplicons, etc.,), indicate that the nucleic acids of interest at some point in time were separated, enriched, sorted, etc., from or with respect to other cellular material to yield a higher proportion of the nucleic acids of interest compared to the other cellular material, contaminates, or active agents such as enzymes, proteins, detergent, cations or anions. "Highly purified," "highly enriched," and "highly isolated," when used with respect to nucleic acids of interest, indicates that the nucleic acids of interest are at least about 70%, about 75%, about 80%, about 85%, about 90% or more, about 95%, about 99% or 99.9% or more purified or isolated from other cellular materials, contaminates, or active agents such as enzymes, proteins, detergent, cations or anions. "Substantially isolated," "substantially purified," and "substantially enriched," when used with respect to nucleic acids of interest, indicate that the nucleic acids of interest are at least about 70%, about 75%, or about 80%, more usually at least 85% or 90%, and sometimes at least 95% or more, for example, 95%, 96%, and up to 100% purified or isolated from other cellular materials, contaminates, or active agents such as enzymes, proteins, detergent, cations or anions.

As used herein, the term "endonuclease" is any enzyme that cleaves a polynucleotide chain by separating nucleotides other than the two end ones.

As used herein, the term "restriction endonuclease" or "restriction enzyme" or "RE enzyme" is any enzyme that recognizes one or more specific nucleotide target sequences within a DNA strand, to cut both strands of the DNA molecule at or near the target site.

As used herein, the term "restriction exonuclease" refers to an enzyme which removes successive nucleotides from the end of a polynucleotide molecule.

As used herein, the term "nucleotide" and "nucleic acid" refers to a molecule that contains a base moiety, a sugar moiety and a phosphate moiety or a modified linkage such as those discussed below. For example, nucleotides can be linked together through their phosphate moieties and sugar moieties creating an inter-nucleoside linkage. The base moiety of a nucleotide can be adenin-9-yl (A), cytosin-1-yl (C), guanin-9-yl (G), uracil-1-yl (U), and thymin-1-yl (T). The sugar moiety of a nucleotide is a ribose or a deoxyribose. The phosphate moiety of a nucleotide is pentavalent phosphate. A non-limiting example of a nucleotide would be 3'-AMP (3'-adenosine monophosphate) or 5'-GMP (5'-guanosine monophosphate). Chemically modified bases, sugars, and alternative linkages are discussed in more detail below. There are many varieties of these types of molecules available in the art and available herein.

As used herein, the terms "oligonucleotide" or a "polynucleotide" are synthetic or isolated nucleic acid polymers including a plurality of nucleotide subunits.

With respect to the disclosed polynucleotide sequences, "N" can be any nucleotide (e.g., A or G or C or T).

As used herein, the terms "complement", "complementary", and "complementarity" with reference to polynucleotides (i.e., a sequence of nucleotides such as an oligonucleotide or a target nucleic acid) refer to the Watson/Crick base-pairing rules. The complement of a nucleic acid sequence as used herein refers to an oligonucleotide which, when aligned with the nucleic acid sequence such that the 5' end of one sequence is paired with the 3' end of the other, is in "antiparallel association." For example, the sequence "5'-A-G-T-3'" is complementary to the sequence "3'-T-C-A-5'". The second sequence can be referred to as the reverse complement of the first sequence, and the first sequence can be referred to as the reverse complement of the second sequence.

Certain bases not commonly found in naturally-occurring nucleic acids may be included in the nucleic acids described herein. These include, for example, inosine, 7-deazaguanine, Locked Nucleic Acids (LNA), and Peptide Nucleic Acids (PNA). Complementarity need not be perfect; stable duplexes may contain mismatched base pairs, degenerative, or unmatched bases. Those skilled in the art of nucleic acid technology can determine duplex stability empirically considering a number of variables including, for example, the length of the oligonucleotide, base composition and sequence of the oligonucleotide, ionic strength and incidence of mismatched base pairs. A complement sequence can also be an RNA sequence complementary to the DNA sequence or its complement sequence, and can also be a cDNA.

As used herein, the term "substantially complementary" means that two sequences hybridize. In some embodiments, the hybridization occurs only under stringent hybridization conditions. The skilled artisan will understand that substantially complementary sequences can, but need not allow, hybridize along their entire length. In particular, substantially complementary sequences may comprise a contiguous sequence of bases that do not hybridize to a target sequence, positioned 3' or 5' to a contiguous sequence of bases that hybridize e.g., under stringent hybridization conditions to a target sequence.

As used herein, the term "hybridize" refers to a process where two substantially complementary or complementary nucleic acid strands anneal to each other under appropriately stringent conditions to form a duplex or heteroduplex through formation of hydrogen bonds between complementary base pairs.

II. Loop Adapter Compositions

A. Design Considerations

A loop adapters for protecting nucleic acid sequences of interest from exonuclease digestion are provided. As used herein, "adapter" and "adaptor" have the same meaning and can be used interchangeably.

The loop adapters are typically short single-stranded oligonucleotides that can form a hairpin structure enclosing the end of linear target DNA to which it is ligated, and protect the target DNA from exonuclease digestion. The sequence of loop adapter typically follows the following general rules: 1) it contains a middle section of sequence that cannot form a duplex (hence the loop), 2) the sequences flanking the middle section are a reverse complement to each other and form a double-strand structure by self-hybridization, 3) it contains a 5' or 3' prime overhang, which is compatible with the loop adapters sticky end of the target DNA molecules and can be used to ligate the loop adapter with the target DNA. The loop adapters typically contain a sticky end segment, a first hybridization segment, loop segment, and a second hybridization segment.

Figure 2A:
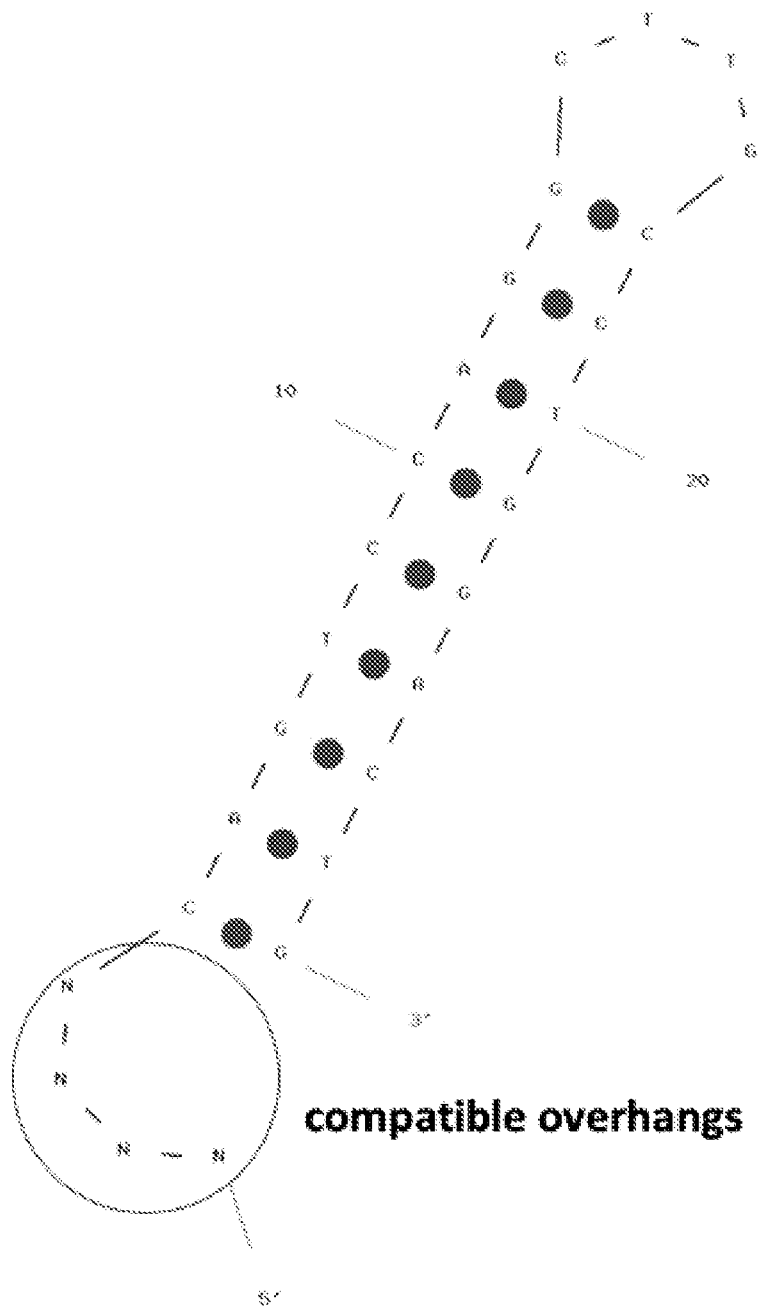
FIGS. 2A-2E illustrate targeted DNA enrichment by loop adapter protection and exonuclease digestion.

The sticky end segment can be a randomized sequence, or specifically designed to hybridize with a sticky end of linear nucleic acid sequence of interest. The sticky end can be any integer number of nucleotides between 1 and 50 inclusive. Typically, the sticky end segment is between about 1 and about 10, or between about 1 and about 5 nucleotides inclusive. FIG. 2A illustrates a loop adapter with a sticky end segment sequence of four nucleotides, nucleotides 1~4 of SEQ ID NO:1, "NNNN."

The first hybridization segment is typically designed to hybridize with the second hybridization segment. The first hybridization segment can be any integer number of nucleotides between 1 and 100 inclusive. Typically, the first hybridization segment is between about 3 and about 50, or between about 5 and about 25, or between about 5 and 15 nucleotides inclusive. FIG. 2A illustrates a first hybridization segment of 9 nucleotides, nucleotides 5-13 of SEQ ID NO:1, "CAGTCCAGG" (SEQ ID NO:2).

The loop segment is typically a hairpin loop that does not hybridize to any target sequence, and thus remains single stranded. When a loop adapter is ligated to a double-stranded linear nucleic acid molecule, the loop forms the new "end" for a terminus of double stranded nucleic acid molecule. When two loop adapters are ligated to a double-stranded linear nucleic acid molecule, the loops form both "ends" for both termini of the double-stranded nucleic acid molecule. See, e.g., FIG. 1. The loop segment can be any integer number of nucleotides between 1 and 50 inclusive. Typically, the loop segment is between about 2 and about 8, or between about 3 and about 5 nucleotides inclusive. FIG.

2A illustrates a loop adapter with a loop segment sequence of four nucleotides, nucleotides 14-17 of SEQ ID NO:1, "CTTG."

The second hybridization segment is typically designed to hybridize with the first hybridization segment. The second hybridization segment can be any integer number of nucleotides between 1 and 100 inclusive, but is typically the same number of nucleotides as the first hybridization segment. Typically, the first hybridization segment is between about 3 and about 50, or between about 5 and about 25, or between about 5 and 15 nucleotides inclusive. FIG. 2A illustrates a second hybridization segment of 9 nucleotides, nucleotide 18-26 of SEQ ID NO:1, "CCTGGACTG" (SEQ ID NO:3).

In FIG. 2A, the loop adapter is illustrated in the following orientation 5'-stick end segment-first hybridization segment-loop segment-second hybridization-3'. Such an adapter will typically hybridize with a 5' overhang or sticky end on a double-stranded nucleic acid molecule.

The loop adapter be in the orientation 5'-first hybridization segment-loop segment-second hybridization-stick end segment-3'. Such an adapter will typically hybridize with a 3' overhang or sticky end on a double-stranded nucleic acid molecule. In some embodiments, the sequence of the loop adapter incorporates one or more restriction enzyme recognition sites into (e.g., embedded in) its sequence. In some embodiments, the recognition site is absent from the target DNA. In this way, the loop adapter(s) can later be cleaved from the target DNA, preferably without cutting the target DNA.

B. Oligonucleotide Composition

The loop adapters disclosed herein can include can be composed of, for example, DNA and/or RNA. Additionally or alternatively, the adapters can include one or more modifications or substitutions to the linkages, nucleobases, or sugars. Modifications should not prevent, and preferably enhance the activity, persistence, or function of the loop adapter. For example, modifications to oligonucleotides for use loop adapters should not prevent, and preferably enhance hairpin formation and hybridization to the target site's sticky end. Suitable modified linkages, bases and base analogues, and modified sugars and sugar analogues are known in the art and non-limiting examples are provided below.

Oligonucleotides are composed a chain of nucleotides which are linked to one another. Canonical nucleotides typically are composed of a nucleobase (nucleic acid base), a sugar moiety attached to the heterocyclic base, and a phosphate moiety which esterifies a hydroxyl function of the sugar moiety. The principal naturally-occurring nucleotides include uracil, thymine, cytosine, adenine and guanine as the heterocyclic nucleobases, and ribose or deoxyribose sugar linked by phosphodiester bonds. As used herein "modified nucleotide" or "chemically modified nucleotide" defines a nucleotide that has a chemical modification of one or more of the nucleobase, sugar moiety or phosphate moiety constituents.

Examples of modified nucleotides with reduced charge include modified internucleotide linkages such as phosphate analogs having achiral and uncharged intersubunit linkages (e.g., Sterchak, E. P. et al., *Organic Chem.*, 52:4202, (1987)), and uncharged morpholino-based polymers having achiral intersubunit linkages (see, e.g., U.S. Pat. No. 5,034,506). Some internucleotide linkage analogs include morpholidate, acetal, and polyamide-linked heterocycles.

Unmodified peptide nucleic acids (PNAs) are synthetic DNA mimics in which the phosphate backbone of the oligonucleotide is replaced in its entirety by repeating N-(2-aminoethyl)-glycine units that are linked by amide bonds. PNAs maintain spacing of nucleobases that is similar to conventional DNA oligonucleotides, but are achiral and neutrally charged molecules. Peptide nucleic acids are composed of peptide nucleic acid residues.

Locked nucleic acids (LNA) are modified RNA nucleotides (see, for example, Braasch, et al., *Chem. Biol.*, 8(1):1-7 (2001)). LNAs form hybrids with DNA which are more stable than DNA/DNA hybrids, a property similar to that of peptide nucleic acid (PNA)/DNA hybrids. Therefore, LNA can be used just as PNA molecules would be except they have a negatively charged backbone, whereas PNAs generally have a neutrally charged backbone. LNA binding efficiency can be increased in some embodiments by adding positive charges to it. Commercial nucleic acid synthesizers and standard phosphoramidite chemistry can be used to make LNAs.

Any of the oligonucleotides can include optional phosphorothioate internucleoside linkages. In some embodiments, the phosphorothioate internucleotide linkages need not be sequential and can be dispersed within the oligonucleotide. In some embodiments, all of the linkages in the loop adapter oligonucleotide are phosphorothioate linkages.

Additionally or alternatively, oligonucleotides can include nucleotides with modified nucleobases, sugar moieties or sugar moiety analogs.

Chemically-modified nucleobases include, but are not limited to, inosine, 5-(1-propynyl) uracil (pU), 2-thio uracil, 5-(1-propynyl) cytosine (pC), 5-methylcytosine, 8-oxo-adenine, 2,6-diaminopurine, pseudocytosine, pseudoisocytosine, 5 and 2-amino-5-(2'-deoxy-β-D-ribofuranosyl)pyridine (2-aminopyridine), and various pyrrolo- and pyrazolopyrimidine derivatives.

Sugar moiety modifications include, but are not limited to, 2'-O-aminoethoxy, 2'-O-amonioethyl (2'-OAE), 2'-O-methoxy, 2'-O-methyl, 2-guanidoethyl (2'-OGE), 2'-0,4'-C-methylene (LNA), 2'-O-(methoxyethyl) (2'-OME) and 2'-O—(N-(methyl)acetamido) (2'-OMA).

III. Methods of Use

The disclosed loop adapters can be used to protect desired nucleic acid (e.g., DNA) sequences of interest from being digested by exonucleases (see, e.g., FIG. 1).

Figure 2B:
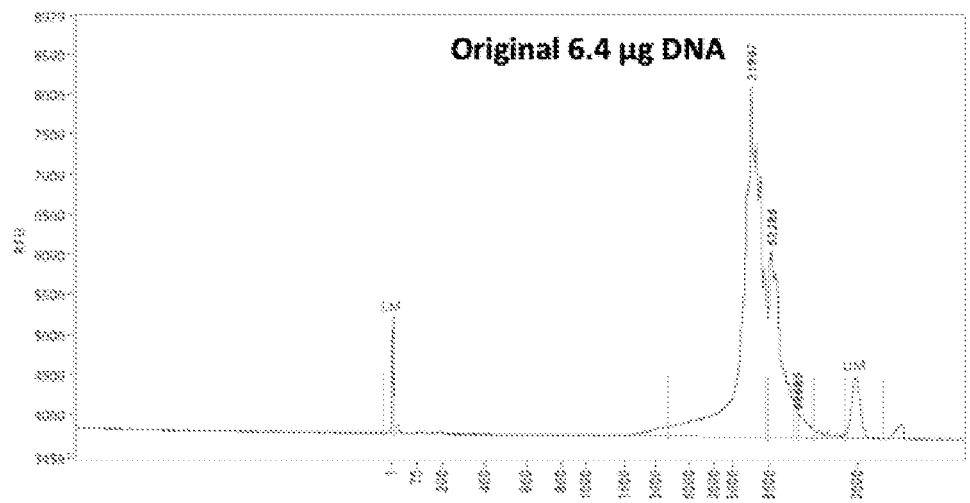
Figure 2C:
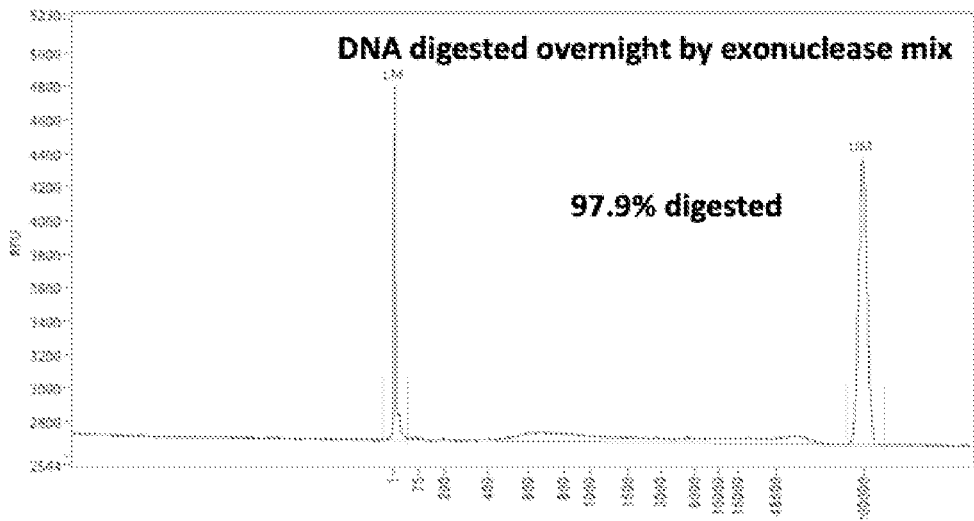
Figure 2D:
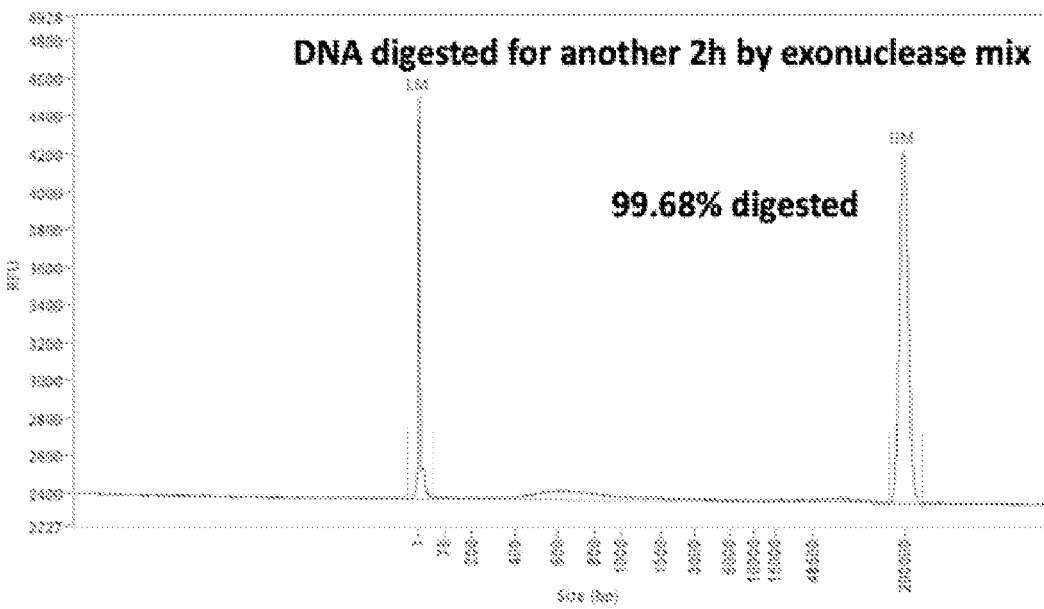

Nucleic acid samples, such DNA extracted from cells, can have two exposed ends (or double-strand breaks) due to random shearing during DNA extraction and/or endonuclease treatment. Without any protection, linear DNA can be degraded almost completely by exonucleases (99.68%, see, e.g., FIGS. 2B-2D).

The disclosed loop adapters can be used to protect the exposed ends of nucleic acid molecules in nucleic samples such as DNA from exonuclease digestion. Typically, nucleic acids in a nucleic acid sample are ligated with the loop adapters and then digested, for example overnight at 37° C., using a lambda exonuclease and/or exonuclease I. In a particular embodiment, lambda exonuclease and exonuclease I are used together in a ratio of 3:1. As discussed above, the adapters can be designed to bind to any specific sticky end. Thus, in some embodiments, the adapters protect only target nucleic acids with the desired sticky ends. Two or more different adapters can be used simultaneously to target sequence flanked by two or more target sequences. In some embodiments, the adapters are a plurality of adapters with a plurality of different sticky end segments to protect a plurality of different fragments. In some embodiments the sticky end segment of the adapters are randomized.

Next, the DNA fragments remaining after digestion (e.g., the protected fragments) can be enriched or purified. For example, in some embodiments, the DNA is enriched or purified using 0.8× magnetic (AMPURE XP™) beads, followed by another 2 hours of digestion using the same enzyme mix.

The disclosed loop adapters are particularly effective for selectively keeping/enriching the desired DNA fragment and removing undesired ones.

In some embodiments, the disclosed methods include further steps designed to encourage the loop adapters to ligate only to the DNA sequence(s) of interest. A nucleic acid sample, such as high molecular weight genomic DNA, is first treated with an alkaline phosphatase, such as Shrimp Alkaline Phosphatases, to make sure that the DNA fragments cannot be ligated to loop adapters lacking a 5' phosphate group.

In some embodiments, the DNA region of interest is cut out of the genome, or another large DNA sample or context, by one or more endonucleases. In some embodiments, the endonuclease(s) is or includes one or a pair of RNA-guided nucleases (e.g., CRISPR endonucleases such as cas9 or cpf1) that are specifically designed to cut the 5' and/or 3' flanking sequences of the target region (see, e.g., FIG. 1).

Thus, in some embodiments, the methods include cutting the DNA region of interest using a CRISPR/Cas system. CRISPR (Clustered Regularly Interspaced Short Palindromic Repeats) is an acronym for DNA loci that contain multiple, short, direct repetitions of base sequences. CRISPRs are often associated with cas genes which code for proteins that perform various functions related to CRISPRs. The CRISPR/Cas system functions as a prokaryotic immune system by conferring resistance to exogenous genetic elements such as plasmids and phages thereby imparting for a form of acquired immunity. Endogenous CRISPR spacers recognize and silence exogenous genetic elements in a manner similar to RNAi in eukaryotic organisms.

A CRISPR system can include one or more of the elements needed to carry out CRISPR/Cas-mediated, targeted endonuclease digestion of a target DNA region. Such elements can include, for example, a Cas endonuclease, a tracr (trans-activating CRISPR) sequence (e.g., tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), other sequences and transcripts from a CRISPR locus, and nucleic acid constructs encoding the foregoing. One or more tracr mate sequences operably linked to a guide sequence (e.g., direct repeat-spacer-direct repeat) can also be referred to as pre-crRNA (pre-CRISPR RNA) before processing or crRNA after processing by a nuclease.

In some embodiments, a tracrRNA and crRNA are linked and form a chimeric crRNA-tracrRNA hybrid where a mature crRNA is fused to a partial tracrRNA via a synthetic stem loop to mimic the natural crRNA:tracrRNA duplex as described in Cong, *Science,* 15:339(6121):819-823 (2013) and Jinek, et al., *Science,* 337(6096):816-21 (2012)). A single fused crRNA-tracrRNA construct is also referred to herein as a guide RNA or gRNA (or single-guide RNA (sgRNA)). Within an sgRNA, the crRNA portion can be identified as the 'target sequence' and the tracrRNA is often referred to as the 'scaffold'.

In some embodiments, one or more elements of a CRISPR system is derived from a type I, type II, or type III CRISPR system. In some embodiments, one or more elements of a CRISPR system is derived from a particular organism including an endogenous CRISPR system, such as *Streptococcus pyogenes.*

In general, a CRISPR system is characterized by elements that promote the formation of a CRISPR complex at the site of a target sequence (also referred to as a protospacer in the context of an endogenous CRISPR system). In the context of formation of a CRISPR complex, "target sequence" refers to a sequence to which a guide sequence is designed to have complementarity, where hybridization between a target sequence and a guide sequence promotes the formation of a CRISPR complex. A target sequence can be any polynucleotide, such as DNA or RNA polynucleotides. In some embodiments, a target sequence is located in DNA from the nucleus or cytoplasm of a cell.

In the target nucleic acid, each protospacer is associated with a protospacer adjacent motif (PAM) whose recognition is specific to individual CRISPR systems. In the *Streptococcus pyogenes* CRISPR/Cas system, the PAM is the nucleotide sequence NGG. In the *Streptococcus thermophiles* CRISPR/Cas system, the PAM is the nucleotide sequence is NNAGAAW. The tracrRNA duplex directs Cas endonuclease to the DNA target consisting of the protospacer and the requisite PAM via heteroduplex formation between the spacer region of the crRNA and the protospacer DNA.

Typically, in the context of an endogenous CRISPR system, formation of a CRISPR complex (including a guide sequence hybridized to a target sequence and complexed with one or more Cas proteins) results in cleavage of one or both strands in or near (e.g., within 1, 2, 3, 4, 5, 6, 7, 8, 9, 10, 20, 50, or more base pairs from) the target sequence. All or a portion of the tracr sequence may also form part of a CRISPR complex, such as by hybridization to all or a portion of a tracr mate sequence that is operably linked to the guide sequence.

The CRISPR/Cas system has been adapted for use as gene editing (silencing, enhancing or changing specific genes) for use in eukaryotes (see, for example, Cong, *Science,* 15:339 (6121):819-823 (2013) and Jinek, et al., *Science,* 337(6096): 816-21 (2012), WO 2013/176772, and WO 2014/018423, which are specifically incorporated by reference herein in their entireties.

There are many resources available for helping practitioners determine suitable target sites once a desired DNA target sequence is identified. For example, numerous public resources, including a bioinformatically generated list of about 190,000 potential sgRNAs, targeting more than 40% of human exons, are available to aid practitioners in selecting target sites and designing the associate sgRNA to affect a nick or double strand break at the site. See also, crispr.u-psud.fr/, a tool designed to help scientists find CRISPR targeting sites in a wide range of species and generate the appropriate crRNA sequence.

In some embodiments, the disclosed methods include CRISPR/Cas system mediated digestion of DNA to created a target DNA fragment that serves as a substrate for loop adapter ligation.

Non-limiting examples of Cas proteins include Cas1, Cas1B, Cast, Cas3, Cas4, Cas5, Cash, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, Cpf1 homologues thereof, or modified versions thereof.

In some embodiments, the endonuclease is Cas9 or Cpf1. Cas9 utilizes two RNA molecules to cut DNA while Cpf1 needs only one. The proteins also cut DNA at different places. Cas9 cuts both strands in a DNA molecule at the same position, leaving behind blunt ends. Cpf1 leaves one strand longer than the other, creating sticky ends. It recognizes a T-rich PAM, TTTN, but on the 5' side of the guide. This makes it distinct from Cas9, which uses an NGG PAM on the 3' side. The cut Cpf1 makes is staggered. In AsCpf1 (from Acidaminococcus) and LbCpf1 (from Lachnospiraceae), it occurs 19 bp after the PAM on the targeted (+) strand and 23 bp on the other strand. Thus, the exact sequence of a sticky end can be programmed when designing the sgRNA, allowing practitioners to design the corresponding sticky end sequence for the loop adaptor(s) to facilitate end protection of the target nucleic acid.

In sum, differences between Cpf1 and Cas9 systems include that Cpf1 recognizes different PAMs, enabling alternative targeting possibilities, creates 4-5 nt long sticky ends, instead of blunt ends produced by Cas9, cuts target DNA further away from PAM, further away from the Cas9 cutting site.

The enzyme can also be mutated with respect to a corresponding wild-type enzyme such that the mutated enzyme lacks the ability to cleave one or both strands of a target polynucleotide containing a target sequence. For example, an aspartate-to-alanine substitution (D10A) in the RuvC I catalytic domain of Cas9 from *S. pyogenes* converts Cas9 from a nuclease that cleaves both strands to a nickase (cleaves a single strand). Other examples of mutations that render Cas9 a nickase include, without limitation, H840A, N854A, and N863A. In some embodiments, two nickases are used in combination.

As illustrated in FIG. 1, nuclease digestion can generate, for example, 5' phosphorylated ends that can be ligated to compatible loop adapters. Thus, in some embodiments, endonuclease, e.g., cpf1, digestion creates new sticky ends that can be ligated to loop adapters with compatible overhangs, as determined by the guide RNA and cutting behavior of the endonuclease. The overhang (i.e., sticky end) of the loop adapter can be designed to hybridize with the overhang (i.e., sticky end) created by the selected endonuclease.

In some embodiments, blunted ends, e.g., cas9 digestion, an overhang, e.g., an A overhang, can be added to the new DNA ends by DNA polymerase (e.g., Taq) to enable ligation with loop adapters with a suitable corresponding overhang (e.g., T).

After ligating the target DNA to the loop adapters, the DNA can be treated with one or more exonucleases (as discussed above) to remove undesired DNA. Next, as discussed above, the target DNA can be enriched by electrophoresis and gel extraction of DNA of the target fragment size.

Any of the enriched DNA can be used as a substrate for sequencing. In particular embodiments, the sequencing method is third-generation sequencing such as a PACBIO™- or OXFORD NANOPORE™-based sequencing.

In some embodiments, the loop adapters on the ends of DNA are cut off by a restriction enzyme, prior to sequencing. In some embodiments, the sequence of the loop adapter incorporates the restriction enzyme's recognition site into (e.g., embedded in) its sequence. In some embodiments, the recognition site is absent from the target DNA. In this way, the loop adapter(s) can be cleaved from the target DNA, preferably without cutting the target DNA.

In other embodiments, the adapters are cleaved from the target DNA using a restriction enzyme that cleaves at a restriction site in the target DNA.

The enriched DNA can be sequenced on any commercial sequencing platform in the market, including, but not limited to, ILLUMINA®, PACBIO™, and ION TORRENT® sequencing platforms. In some embodiments, the sequencing step includes use of long-read sequencing technology, such as for example, using OXFORD NANOPORE™ sequencing. OXFORD NANOPORE™ sequencing is an emerging third-generation sequencing technology, that can generate ultra-long reads exceeding 800 kb (Jain et al., Nat Biotechnol 36, 338-345, doi: 10.1038/nbt.4060 (2018)) in a portable device called MINION™. These long-reads come without much compromise on reads consensus accuracy since the sequencing errors are mostly random (Loman et al., *Nat Methods* 12, 733-U751, doi: 10.1038/Nmeth.3444 (2015)). They hold great promise in calling and phasing variants, assembling scaffold, and prospectively detecting epigenetic marks (Cretu et al., *Nat Commun* 8, 1326, doi: 10.1038/s41467-017-01343-4 (2017), Simpson et al., *Nat Methods* 14, 407-410, doi: 10.1038/nmeth.4184 (2017)

In particular embodiments, the methods include preparing a sequencing library, for example a Nanopore sequencing library from the enriched nucleic acids.

Any of the steps can include bioinformatics tools or techniques, and can include bioinformatics analysis. Exemplary preferred analyses include, but are not limited to, basecalling, sequence alignment(s), etc.

The nucleic acid sample can be, for example, nuclear genomic DNA, mitochondrial genomic DNA, or a combination thereof. The sample can be prokaryotic or eukaryotic cells. The cells can be, for example microbial, or from a higher organism, for example, an animal such as mammal including humans.

In some embodiments, the nucleic acid sample can be from a small number of cells. The source of the nucleic acid sample can from, for example, any integer between 1 and 1,000,000 cells inclusive, or any range formed of two integers there between, for example, between 1 and 10,000, 1 and 1,000, 1 and 100, 1 and 10, or 1 single cell.

In some embodiments, any of the disclosed methods further include isolating the nucleic acid sample from, for example, a cell or cells. The isolation can include releasing the target nucleic acid sample by, for example, lysing the cell(s). The lysing can be chemical, enzymatic, osmotic, mechanical, or a combination thereof.

Any of the methods can include one or more restriction digestions of the nucleic acid sample prior ligating loop adapters.

Any of the methods can include removing contaminants (e.g., one or more of primers, dNTPs, RNA, etc.) at any stage or step.

Any of the disclosed methods can further include amplifying the nucleic acid sample, or a fraction thereof, by, for example, PCR. In some embodiments, the methods do not include a PCR step.

Any of the disclosed methods can further include one or more further rounds or techniques of enrichment and/or purification of the nucleic acid sample, target nucleic acid, etc. The enrichment and/or purification can include size selection.

Multiple genes of interest can be digested and ligated with loop adapters at the same time. Thus, the disclosed compositions encompass multiplexing. DNA tens, hundreds, or more kb in length can be enriched without PCR amplification. The disclosed methods provide a solution to multiplexed enrichment of ultra-long DNA fragments in a PCR-free manner, thus making it possible to analyze DNA methylation at base resolution. Aberrant DNA methylation is widely reported in, for example, human cancers. However, there is no method to directly sequence DNA methylation in a given region of the genome. The disclosed enrichment method coupled with the Oxford Nanopore sequencing technology can provide both DNA sequence and DNA methylation pattern simultaneously.

The disclosed compositions and methods can reduce the cost, and improve the efficiency and accuracy of downstream sequencing. It is compatible with most sequencing platforms in the market and may make genetic testing in clinical diagnosis feasible.

The compositions and methods can be used over a range of application, including, but not limited to enriching any regions of the genome for sequencing for diagnosis or research; enrich a panel of genes for sequencing for pre-marital genetic test; enrich a panel of genes for sequencing for prenatal genetic test; enrich DNA for research; study DNA methylation, for example, in cancer.

The disclosed compositions and methods of use thereof can be further understood through the following numbered paragraphs.

1. A nucleic acid loop adapter comprising
   (i) a sticky end nucleic acid segment designed to hybridize with a sticky end of a target linear nucleic acid;
   (ii) a first hybridization nucleic acid segment designed to hybridize with a second hybridization nucleic acid segment;
   (ii) a loop nucleic acid segment that remains single stranded; and
   (iv) the second hybridization nucleic acid segment.
2. The nucleic acid loop adapter of paragraph 1, wherein the sticky end segment comprises or consists of any integer number of nucleotides between 1 and 50 inclusive, or between about 1 and about 10, or between about 1 and about 5 nucleotides inclusive, or 4 nucleotides.
3. The nucleic acid loop adapter of paragraphs 1 or 2, wherein the first hybridization nucleic acid segment comprises or consists of any integer number of nucleotides between 1 and 100 inclusive, or between about 3 and about 50, or between about 5 and about 25, or between about 5 and 15 nucleotides inclusive, or 9 nucleotides.
4. The nucleic acid loop adapter of any one of paragraphs 1-3, wherein the first hybridization nucleic acid segment comprises or consists of the sequence CAGTCCAGG (SEQ ID NO:2).
5. The nucleic acid loop adapter of any one of paragraphs 1-4 wherein the loop nucleic acid segment comprises or consists of an integer number of nucleotides between 1 and 50 inclusive.
6. The nucleic acid loop adapter of any one of paragraphs 1-5, wherein the loop nucleic acid segment comprises or consists of the sequence "CTTG."
7. The nucleic acid loop adapter of any one of paragraphs 1-6, wherein the second hybridization nucleic acid segment comprises or consists any integer number of nucleotides between 1 and 100 inclusive, or between about 3 and about 50, or between about 5 and about 25, or between about 5 and 15 nucleotides inclusive, or 9 nucleotides.
8. The nucleic acid loop adapter of any one of paragraphs 1-7, wherein the second hybridization nucleic acid segment comprises or consists of the sequence CCTGGACTG (SEQ ID NO:3).
9. The nucleic acid loop adapter of any one of paragraphs 1-8, comprising the orientation 5'-stick end segment-first hybridization segment-loop segment-second hybridization-3'.
10. The nucleic acid loop adapter of any one of paragraphs 1-8, comprising the orientation 5'-first hybridization segment-loop segment-second hybridization-stick end segment-3'.
11. The nucleic acid loop adapter of any one of paragraphs 1-10 comprising a restriction enzyme recognition site.
12. A nucleic acid loop adapter comprising the nucleic acid sequence of SEQ ID NO:1.
13. A nucleic acid loop adapter comprising the structure of FIG. 2A.
14. The nucleic acid loop adapter of any one of paragraphs 1-13, wherein the adapter comprises or consists of DNA.
15. The nucleic acid loop adapter of any one of paragraphs 1-14 wherein the adapter comprises or consists of chemically modified nucleobases, sugars, and/or internucleoside linkages.
16. A composition comprising a plurality nucleic acid loop adapters.
17. The composition of paragraph 16, comprising any integer between 1 and 1,000 inclusive of different nucleic acid loop adapter sequences.
18. A method of enriching a target nucleic acid comprising
(i) ligating one or more nucleic acid loop adapters of any one of paragraphs 1-17 to linear target nucleic acids in a nucleic acid sample comprising the linear target nucleic acids, and
(ii) treating the nucleic acid sample with one or more exonucleases, wherein loop adapter ligated nucleic acids are undigested by the exonuclease(s) and non-adapter ligated nucleic acids are digested by the exonuclease(s).
19. The method of paragraph 18, wherein the sticky end nucleic acid segment hybridizes with a sticky end of a target linear nucleic acid.
20. The method of paragraphs 18 or 19, wherein the exonuclease(s) comprise lambda exonuclease, exonuclease I, or a combination there, optionally in a ratio of 3:1.
21. The method of any one of paragraphs 18-20, further comprising enriching or purifying the undigested nucleic acids.
22. The method of any one of paragraphs 18-21, wherein the nucleic acid sample is mechanically, chemically, or enzymatically sheared or digested prior to ligation of the adapter sequences.
23. The method of any one of paragraphs 18-21, comprising treating the nucleic acid sample with one or more endonucleases prior to ligation of the adapter sequences to the linear target nucleic acid.
24. The method of paragraph 23, wherein one or more of the endonucleases forms part of a CRISPR/Cas system comprising one or more guide RNAs that specifically targets each endonuclease to the linear target nucleic acid.
25. The method of paragraph 23, wherein the one or more endonucleases create 5' and/or 3' sticky ends flanking the linear target nucleic acid.
26. The method of any one of paragraphs 23-25, wherein the one or more endonucleases comprise a pair of RNA-guided nucleases (e.g., cas9 or cpf1, etc) that are specifically designed to cut the 5' and 3' flanking sequences of the target nucleic acid sequence.

27. The method of any one of paragraphs 18-26, further comprising treating the nucleic acid sample with one or more an alkaline phosphatases, such as Shrimp Alkaline Phosphatases, prior to ligation of the loop adapters.
28. The method of any one of paragraphs 18-27, further comprising extending the 3' and/or 5' ends or sticky ends of the linear target nucleic acid using a polymerase.
29. The method of any of paragraphs 18-28, further comprising sequencing the undigested nucleic acids.
30. The method of paragraph 29, wherein the sequencing comprises forming a sequencing library from the undigested nucleic acids.
31. The method of paragraph 30, wherein the sequencing comprises a long-read sequencing technology, such as for example, a Nanopore sequencing technology.
32. The method of any one of paragraphs 18-31, wherein the loop adapters are cleaved, digested, or otherwise removed from the undigested nucleic acids, preferably prior to sequencing.
33. The composition or method of any one of paragraphs 1-33, wherein some or all of the nucleic acids are DNA.

EXAMPLES

Example 1: Targeted DNA is Enriched by Loop Adapter Protection and Exonuclease Digestion A method to enrich DNA from any DNA sequence of interest was developed by using loop adapters to protect the sequence from being digested by an exonuclease (FIG. 1).

DNA extracted from cells has two exposed ends (or double-strand breaks) due to random shearing during DNA extraction. Without any protection, linear DNA can be degraded almost completely by exonucleases (99.68%, FIGS. 2B-2D).

To protect the exposed ends of DNA from exonuclease digestion, a loop adapter with a hairpin structure was developed NNNNCAGTCCAGG(CTTG)CCTGGACTG (FIG. 2A, SEQ ID NO:1). It forms a hairpin-like structure by self-hybridization (FIG. 2A). The G(CTTG)C sequence in the middle of the oligonucleotide made this loop structure very stable, and the flanking sequence of CAGTCCAGG (SEQ ID NO:2) and CCTGGACTG (SEQ ID NO:3) were designed to provide a stable stem structure without affecting the loop region. The NNNN sequence on its 5' prime end is flexible and can be changed to be compatible with the DNA sticky end to be ligated. In this case, "NNNN" was T for ligating A-tailed DNA. The design of loop adapters is flexible and not limited to the example shown in FIG. 2A. Other sequence composition and variable length can be used to construct the loop adapter.

The loop adapter can be synthesized as an oligonucleotide. It was diluted to 10 µM in hybridization buffer (10 mM Tris, pH 8.0, 50 mM NaCl, 1 mM EDTA) and induced to form the hairpin structure by heating to 95° C. for 2 mins followed by incubation on ice for 5 mins.

To demonstrate the function of the loop adapter, it was ligated to an A-tailed PCR amplicon, and then the DNA was digested with the lambda exonuclease overnight at 37° C. The lambda exonuclease and exonuclease I were combined at a unit ratio of 3:1 to ensure a complete digestion of unligated linear DNA. The next day, the DNA was purified using 0.8× AMPure XP beads, followed by another 2 hours of digestion using the same enzyme mix.

Figure 2E:
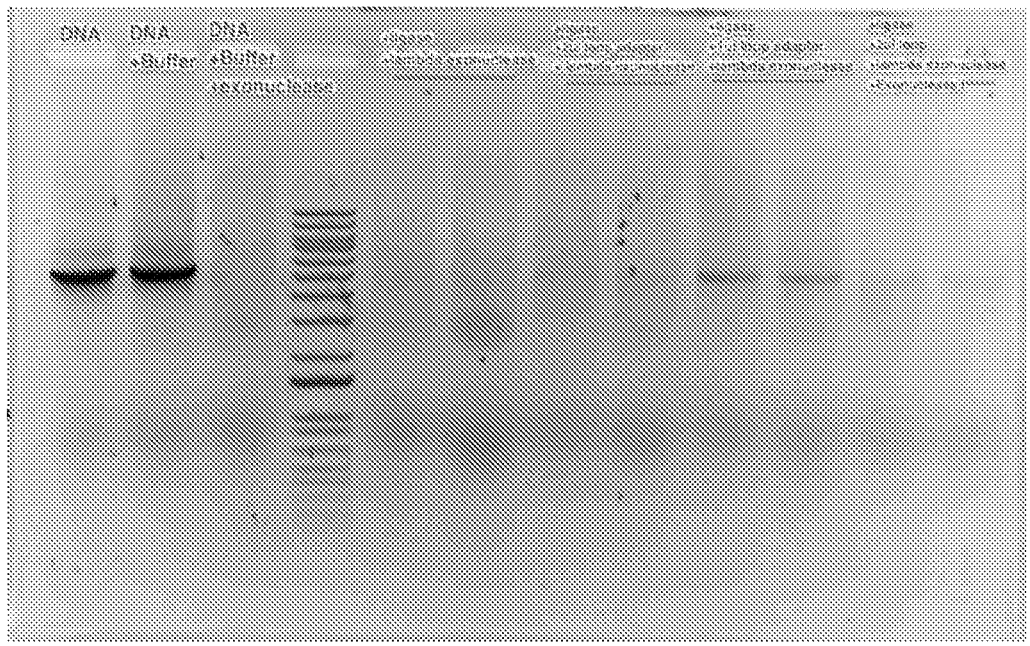

Results show that this loop adapter can protect DNA from extensive exonuclease digestion (FIG. 2E).

It is understood that the disclosed method and compositions are not limited to the particular methodology, protocols, and reagents described as these may vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a", "an", and "the" include plural reference unless the context clearly dictates otherwise.

Throughout the description and claims of this specification, the word "comprise" and variations of the word, such as "comprising" and "comprises," means "including but not limited to," and is not intended to exclude, for example, other additives, components, integers or steps.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. It should be understood that all of the individual values and sub-ranges of values contained within an explicitly disclosed range are also specifically contemplated and should be considered disclosed unless the context specifically indicates otherwise. Finally, it should be understood that all ranges refer both to the recited range as a range and as a collection of individual numbers from and including the first endpoint to and including the second endpoint. In the latter case, it should be understood that any of the individual numbers can be selected as one form of the quantity, value, or feature to which the range refers. In this way, a range describes a set of numbers or values from and including the first endpoint to and including the second endpoint from which a single member of the set (i.e. a single number) can be selected as the quantity, value, or feature to which the range refers. The foregoing applies regardless of whether in particular cases some or all of these embodiments are explicitly disclosed.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention

We claim:

1. A nucleic acid loop adapter comprising
   (i) a sticky end nucleic acid segment designed to hybridize with a sticky end of a target linear nucleic acid;
   (ii) a first hybridization nucleic acid segment designed to hybridize with a second hybridization nucleic acid segment;
   (iii) a loop nucleic acid segment that remains single stranded; and
   (iv) the second hybridization nucleic acid segment; wherein the first hybridization nucleic acid segment is sequence CAGTCCAGG (SEQ ID NO: 2), and the second hybridization nucleic acid segment is sequence CCTGGACTG (SEQ ID NO: 3); or wherein the second hybridization nucleic acid segment is sequence CAGTCCAGG (SEQ ID NO:2), and the first hybridization nucleic acid segment is sequence CCTGGACTG (SEQ ID NO:3); or wherein the second hybridization nucleic acid segment consists of the sequence CAGTCCAGG (SEQ ID NO:2), and the first hybridization nucleic acid segment consists of the sequence CCTGGACTG (SEQ ID NO:3).

2. The nucleic acid loop adapter of claim 1, wherein the sticky end segment comprises any integer number of nucleotides between 1 and 50 inclusive, or between about 1 and about 10, or between about 1 and about 5 nucleotides inclusive, or 4 nucleotides.

3. The nucleic acid loop adapter of claim 1, wherein:
   (a) the first hybridization nucleic acid segment consists of the sequence CAGTCCAGG (SEQ ID NO:2);
   (b) the loop nucleic acid segment comprises an integer number of nucleotides between 1 and 50 inclusive;
   (c) the loop nucleic acid segment comprises of the sequence "CTTG"; and/or
   (d) some or all of the nucleic acids are DNA.

4. The nucleic acid loop adapter of claim 1, wherein the second hybridization nucleic acid segment consists of the sequence CCTGGACTG (SEQ ID NO:3).

5. The nucleic acid loop adapter of claim 1, comprising:
   (a) the orientation 5'-sticky end segment-first hybridization nucleic acid segment-loop segment-second hybridization nucleic acid segment-3';
   (b) the orientation 5'-first hybridization nucleic acid segment-loop segment-second hybridization nucleic acid segment-stick end segment-3'; and/or
   (c) a restriction enzyme recognition site.

6. The nucleic acid loop adapter of claim 1 comprising the nucleic acid sequence of SEQ ID NO: 1.

7. The nucleic acid loop adapter of claim 1, wherein:
   (a) the adapter comprises DNA; and/or
   (b) the adapter comprises chemically modified nucleobases, sugars, and/or internucleoside linkages.

8. A composition comprising a plurality of the nucleic acid loop adapters of claim 1.

9. The composition of claim 8, comprising any integer between 1 and 1,000 inclusive of different nucleic acid loop adapter sequences.

10. A method of enriching a target nucleic acid in a sample comprising a multiplicity of nucleic acids, the method comprising
(i) treating the nucleic acids in the sample with one or more shrimp alkaline phosphatases;
(ii) cleaving the target nucleic acids using one or more RNA-guided endonucleases that creates 5' and/or 3' sticky ends flanking the linear target nucleic acid;
(iii) ligating one or more nucleic acid loop adapters of claim 1 to linear target nucleic acids in the sample to form loop-adapter ligated target nucleic acids, and
(iv) treating the nucleic acid sample with one or more exonucleases,
wherein loop adapter ligated target nucleic acids are undigested by the exonuclease(s) and non-adapter ligated nucleic acids are digested by the exonuclease(s).

11. The method of claim 10, wherein the sticky end nucleic acid segment hybridizes with a sticky end of a target linear nucleic acid.

12. The method of claim 10, wherein:
(a) the exonuclease(s) comprise lambda exonuclease, or exonuclease I, or a combination thereof in a ratio of 3:1;
(b) the nucleic acid sample is mechanically, chemically, or enzymatically sheared or digested prior to ligation of the adapter sequences; and/or
(c) wherein the loop adapters are cleaved, digested, or otherwise removed from the loop adapter ligated undigested nucleic acids, prior to sequencing.

13. The method of claim 10, further comprising enriching or purifying the loop adapter ligated undigested nucleic acids.

14. The method of claim 10 wherein the RNA-guided nuclease is cas9 or cpf1.

15. The method of claim 10, further comprising:
(a) extending the 3' and/or 5' ends or sticky ends of the linear target nucleic acid using a polymerase; and
(b) sequencing the undigested nucleic acids.

16. The method of claim 15, wherein the sequencing comprises forming a sequencing library from the undigested nucleic acids.

17. The method of claim 16, wherein the sequencing comprises a long-read sequencing technology.

18. A nucleic acid loop adapter having the nucleic acid sequence of SEQ ID NO: 1.

* * * * *

```
                              SEQUENCE LISTING

<160> NUMBER OF SEQ ID NOS: 3

<210> SEQ ID NO 1
<211> LENGTH: 26
<212> TYPE: DNA
<213> ORGANISM: Artificial Sequence
<220> FEATURE:
<223> OTHER INFORMATION: synthetic polynucleotide
<220> FEATURE:
<221> NAME/KEY: misc_feature
<222> LOCATION: (1)..(4)
<223> OTHER INFORMATION: n is a, c, g, or t

<400> SEQUENCE: 1
nnnncagtcc aggcttgcct ggactg                                           26

<210> SEQ ID NO 2
<211> LENGTH: 9
<212> TYPE: DNA
<213> ORGANISM: Artificial Sequence
<220> FEATURE:
<223> OTHER INFORMATION: synthetic polynucleotide

<400> SEQUENCE: 2 cagtccagg                                                               9

<210> SEQ ID NO 3
<211> LENGTH: 9
<212> TYPE: DNA
<213> ORGANISM: Artificial Sequence
<220> FEATURE:
<223> OTHER INFORMATION: synthetic polynucleotide

<400> SEQUENCE: 3 cctggactg                                                               9
```